United States Patent Office 3,222,340
Patented Dec. 7, 1965

3,222,340
PROCESS FOR PREPARING BEAD POLYMERS IN AQUEOUS MEDIUM CONTAINING CALCIUM PHOSPHATE AND AN AMINO POLYACETIC ACID COMPOUND
Alva F. Harris, Wilbraham, Mass., assignor to Monsanto Company, a corporation of Delaware
No Drawing. Filed Feb. 27, 1961, Ser. No. 91,581
6 Claims. (Cl. 260—93.5)

This invention relates to the suspension polymerization of vinylidene monomers. More particularly, the invention relates to a method of improving the performance of calcium phosphates as suspending agents in the suspension polymerization of vinylidene monomers.

It is known to prepare bead polymers by polymerizing a vinylidene monomer with agitation in an aqueous medium containing a dispersed calcium phosphate as a suspending agent. (See, e.g., U.S. Patents 2,524,627; 2,652,392, and 2,673,194.) The erratic performance of calcium phosphates as suspending agents has been recognized, and various measures have been proposed to obviate this liability. Among the more successful measures have been the control of the particle size and $Ca/PO_4$ ratio of the suspending agents and the use of adjuvants such as anionic surface-active agents, buffers, and inorganic salts.

An object of this invention is to provide a novel method of improving the performance of calcium phosphates as suspending agents in the suspension polymerization of vinylidene monomers.

Another object is to provide a method of preparing bead polymers having a smaller average particle size by a process wherein a vinylidene monomer is polymerized in suspension in an aqueous medium containing a dispersed calcium phosphate.

These and other objects are attained by conducting the aqueous suspension polymerization of a vinylidene monomer with a calcium phosphate suspending agent in the presence of about 0.5–15%, based on the weight of the suspending agent, of an amino polyacetic acid or derivative thereof.

The following examples are given to illustrate the invention. Unless otherwise specified, quantities mentioned are quantities by weight.

EXAMPLE I

Part A

A bead polystyrene is prepared from the following polymerization recipe.

| Component: | Parts |
|---|---|
| Water (distilled) | 200 |
| Styrene | 100 |
| $Ca_3(PO_4)_2$ [1] | 2 |
| $CaCO_3$ | 0.24 |
| Benzoyl peroxide | 0.20 |

[1] Product obtained by heating an aqueous slurry containing 1–2% of $Ca(OH)_2$ to 60–70° C. and adding sufficient $H_3PO_4$ with agitation to obtain a pH of 7.5–8.0.

A slurry of the water, tricalcium phosphate, and calcium carbonate is charged to a suitable reaction vessel, and a nitrogen purge of the vessel is begun. The slurry is deoxygenated by boiling for 5 minutes and then cooled to 25–30° C. A solution of the benzoyl peroxide in styrene, which has been pre-purged with nitrogen for about 15 minutes, is now added to the reaction vessel. The nitrogen purge of the vessel is continued for another 10 minutes. The vessel is then sealed and heated for 10 hours at 90° C. while being rotated end-over-end at 50 r.p.m.

After completion of the reaction, the polymer bead slurry is adjusted to a pH of 3 with an 85% aqueous solution of $H_3PO_4$, heated with agitation for 15 minutes at 80° C., and filtered to remove the tricalcium phosphate, calcium carbonate, and water. The polymer beads are washed with water and dried. The polystyrene beads have an average diameter of 6350 mu.

Part B

In the preparation of a series of bead polystyrenes, Part A is repeated with the exception that varying amounts of the trisodium salt of (hydroxyethyl)ethylenediamine triacetic acid are charged to the reaction vessel together with the water, tricalcium phosphate, and calcium carbonate. The amounts of amino polyacetic acid salt employed in each case, together with the average diameters of the polystyrene beads formed by the reactions, are shown below.

| Amino polyacetic acid salt (parts): | Average diameter of polymer beads (mu) |
|---|---|
| 0.01 | 3911. |
| 0.02 | 432. |
| 0.03 | 432. |
| 0.05 | 326. |
| 0.10 | 147. |
| 0.30 | 5670. |
| 0.50 | Coagulated. |
| 1.00 | Coagulated. |
| 1.50 | Coagulated. |
| 2.00 | Coagulated. |

A similar reduction in the particle size of the polymer results when 0.01–0.3 part of ethylenediamine tetraacetic acid or the pentasodium salt of diethylenetriamine pentaacetic acid is employed instead of the trisodium salt of (hydroxyethyl)ethylenediamine triacetic acid.

EXAMPLE II

Part A

A bead polystyrene is prepared from the following polymerization recipe.

| Component: | Parts |
|---|---|
| Water | 200 |
| Styrene | 100 |
| $CA_3(PO_4)_2$ [1] | 2 |
| $CaCO_3$ | 0.24 |
| Benzoyl peroxide | 0.20 |

[1] Product obtained by heating an aqueous slurry containing 1–2% of $Ca(OH)_2$ to 60–70° C. and adding sufficient $H_3PO_4$ with agitation to obtain a pH of 7.5–8.0.

A suitable reaction vessel is charged with a slurry of the water, tricalcium phosphate, and calcium carbonate, followed by the addition of a solution of the benzoyl peroxide in styrene. The vessel is then sealed and heated for 10 hours at 90° C. while being rotated end-over-end at 50 r.p.m.

After completion of the reaction, the polymer bead slurry is adjusted to a pH of 3 with an 85% aqueous solution of $H_3PO_4$, heated with agitation for 15 minutes at 80° C., and filtered to remove the tricalcium phosphate, calcium carbonate, and water. The polymer beads are washed with water and dried. The polystyrene beads have an average diameter of 368 mu.

Part B

In the preparation of a series of bead polystyrenes, Part A is repeated with the exception that varying amounts of the trisodium salt of (hydroxyethyl)ethylenediamine triacetic acid are charged to the reaction vessel together with the water, tricalcium phosphate, and calcium carbonate. The amounts of amino polyacetic acid salt employed in each case, together with the average diameters of the polystyrene beads formed by the reactions, are shown below.

| Amino polyacetic acid salt (parts): | Average diameter of polymer beads (mu) |
|---|---|
| 0.01 | 300. |
| 0.02 | 203. |
| 0.03 | 203. |
| 0.05 | 200. |
| 0.10 | 195. |
| 0.30 | 349. |
| 0.50 | 2058. |
| 1.00 | Coagulated. |
| 1.50 | Coagulated. |
| 2.00 | Coagulated. |

EXAMPLE III

Part A

A bead polyvinyl acetate is prepared from the following polymerization recipe.

| Component: | Parts |
|---|---|
| Water | 1000 |
| Vinyl acetate | 100 |
| $Ca_3(PO_4)_2$ | 0.22 |
| Benzoyl peroxide | 0.5 |

A suitable reaction vessel is charged with a slurry of the tricalcium phosphate in water, followed by the addition of a solution of the benzoyl peroxide in vinyl acetate. Polymerization is conducted with agitation at 70° C. for about 5 hours. The polymer slurry is filtered to isolate the polymer beads, which are then washed with dilute $H_3PO_4$ and dried. The product is a bead polyvinyl acetate having an average particle size of 2500 mu in diameter.

Part B

Part A is repeated with the exception that 0.022 part of the tetrasodium salt of ethylenediamine tetraacetic acid is added to the reaction vessel together with the tricalcium phosphate and water. The polyvinyl acetate beads have an average diameter of 300 mu.

EXAMPLE IV

Part A

A bead polymethyl methacrylate is prepared from the following polymerization recipe.

| Component: | Parts |
|---|---|
| Water | 300 |
| Methyl methacrylate | 100 |
| Hydroxy apatite | 1 |
| Benzoyl peroxide | 0.5 |

A suitable reaction vessel is charged with a slurry of the hydroxy apatite in water, followed by the addition of a solution of the benzoyl peroxide in methyl methacrylate. Polymerization is conducted with agitation at 80° C. for about 6 hours. The polymer slurry is filtered to isolate the polymer beads, which are then washed with dilute $H_3PO_4$ and dried. The product is a bead polymethyl methacrylate having an average particle size of 3550 mu in diameter.

Part B

Part A is repeated with the exception that 0.1 part of the trisodium salt of (hydroxyethyl)ethylenediamine triacetic acid is added to the reaction vessel together with the hydroxy apatite and water. The polymethyl methacrylate beads have an average diameter of 250 mu.

The process of the invention is a method of improving the performance of calcium phosphates as suspending agents in the suspension polymerization of vinylidene monomers by conducting the polymerization in the presence of 0.5–15% (preferably 1–10%), based on the weight of the suspending agent, of an amino polyacetic acid or derivative thereof.

Amino polyacetic acids (i.e., compounds containing at least two —$CH_2COOH$ groups bound to a nitrogen atom) utilizable in the practice of the invention include, e.g., aminoacetic acid, aminotriacetic acid, alkylenepolyamine polyacetic acids such as ethylenediamine diacetic acid, ethylenediamine triacetic acid, (hydroxyethyl)ethylenediamine triacetic acid, ethylenediamine tetraacetic acid, propylenediamine tetraacetic acid, butylenediamine diacetic acid, diethylenetriamine pentaacetic acid, etc., and mixtures thereof.

Amino polyacetic acid derivatives utilizable in the practice of the invention are the alkali metal salts, alkylamine salts, dialkylamine salts, and alkyl esters of the acids. Exemplary of such derivatives are the mono-, di-, and trisodium salts of (hydroxyethyl)ethylenediamine triacetic acid, the corresponding potassium and lithium salts, the n-butylamine and diethylamine salts of (hydroxyethyl)ethylenediamine triacetic acid, the n-butyl ester of (hydroxyethyl)ethylenediamine triacetic acid, the corresponding derivatives of the other amino polyacetic acids mentioned above, and mixtures thereof.

With the exception of the point of novelty of the use of an amino polyacetic acid compound as an adjuvant, the process of the invention is conventional. Thus, a material comprising at least one suspension-polymerizable vinylidene monomer is polymerized with agitation in an aqueous medium containing about 0.1–5%, based on the weight of the polymerizable material, of a dispersed calcium phosphate suspending agent at temperatures usually in the range of about 50–150° C. under atmospheric or superatmospheric pressure.

The amount of water employed is such that the water/monomer weight ratio is in the range of 10:1 to 2:3, usually 3:1 to 1:1. The organic phase of the reaction mixture usually contains catalytic amounts of a free radical polymerization initiator such as a peroxy or azo compound, e.g., benzoyl peroxide, di-t-butyl peroxide, dicumyl peroxide, t-butyl peracetate, azoisobutyronitrile, etc. A buffer is usually employed to maintain the pH of the reaction mixture at about 6–9. If desired, the reaction mixture can also contain optional ingredients such as preformed polymers, stabilizers, plasticizers, fillers, etc.

The calcium phosphate employed as a suspending agent is a compound which is difficultly soluble in water, i.e., insoluble in less than 100 times its weight of water, and is used in amounts in excess of its solubility limit in the aqueous medium. Although the present invention is applicable to the improvement of the performance of calcium phosphate suspending agents already known not to have optimum properties as suspending agents, it is preferable that the suspending agent be a calcium phosphate which has optimum properties as a suspending agent. As taught by the prior art, the calcium phosphate, in order to have optimum properties as a suspending agent, should contain at least three equivalents of calcium per phosphate radical and should have a very small particle size, e.g., less than about 50 microns in diameter. Utilizable calcium phosphates include tricalcium phosphate, its hemihydrate, hydroxy apatite, etc.

The invention is applicable to the polymerization of materials comprising at least one suspension-polymerizable vinylidene monomer. Exemplary of suspension-polymerizable vinylidene monomers are acrylic-type esters such as methyl methacrylate, vinyl esters such as vinyl acetate, vinyl aromatic compounds such as styrene, ar-substituted styrenes (e.g., o-, m-, and p-methylstyrenes, dichlorostyrenes, etc.), vinyl naphthalene, etc., and mixtures thereof. The invention is especially useful in the polymerization of styrene alone or with copolymerizable monomers such as acrylonitrile, methacrylonitrile, methyl methacrylate, etc., but many other materials which can be polymerized in the practice of the present invention will be obvious to those skilled in the art.

Conducting the suspension polymerization of vinylidene monomers with calcium phosphate suspending agents in the presence of amino polyacetic acid compounds results in improving the performance of the calcium phosphates as suspending agents. Thus, the bead polymers formed by the reaction have a smaller, and usually more uniform, particle size than the bead polymers formed in the absence of an amino polyacetic acid compound.

It is obvious that many variations can be made in the products and processes set forth above without departing from the spirit and scope of this invention.

What is claimed is:

1. In a process for preparing a bead polymer by polymerizing a material comprising at least one suspension-polymerizable vinylidene monomer of the group consisting of methyl methacrylate, a vinyl ester, styrene, an ar-methylstyrene, a dichlorostyrene, and vinyl naphthalene in the presence of a free radical polymerization initiator in suspension in an aqueous medium containing about 0.1–5%, based on the weight of the polymerizable material, of a finely-divided calcium phosphate suspending agent, the improvement which comprises conducting the polymerization in the presence of about 0.5–15%, based on the weight of the suspending agent, of an amino polyacetic acid compound of the group consisting of amino polyacetic acids and the alkali metal salts, alkylamine salts, dialkylamine salts, and alkyl esters of amino polyacetic acids.

2. A process as in claim 1 wherein the amino polyacetic acid compound is an alkylenepolyamine polyacetic acid.

3. A process as in claim 1 wherein the amino polyacetic acid compound is an alkali metal salt of an alkylenepolyamine polyacetic acid.

4. A process as in claim 3 wherein the amino polyacetic acid compound is the trisodium salt of (hydroxyethyl)-ethylenediamine triacetic acid.

5. A process as in claim 1 wherein the suspension-polymerizable vinylidene monomer is styrene.

6. In a process for preparing a bead polymer by polymerizing 100 parts by weight of styrene in the presence of a free radical polymerization initiator in suspension in an aqueous medium containing about 2 parts by weight of a finely-divided tricalcium phosphate suspending agent, the improvement which comprises conducting the polymerization in the presence of 0.5–15%, based on the weight of the suspending agent, of the trisodium salt of (hydroxyethyl)ethylenediamine triacetic acid.

References Cited by the Examiner
UNITED STATES PATENTS

| | | | |
|---|---|---|---|
| 2,558,728 | 7/1951 | Britton et al. | 260—45.85 |
| 2,715,118 | 8/1955 | Grim | 260—93.5 |
| 2,857,368 | 10/1958 | Ingraham | 260—92.8 |
| 2,878,200 | 3/1959 | Holmes et al. | 260—29.6 |
| 2,917,477 | 12/1959 | Suen et al. | 260—85.5 |
| 2,933,467 | 4/1960 | Borunsky | 260—93.5 |
| 3,125,557 | 3/1964 | Harris | 260—92.8 |

OTHER REFERENCES

Hohenstein et al.: Polymerization of Olefins and Diolefins in Suspension and Emulsion, Part I, Journal of Polymer Science, vol. 1 (1946), pages 127 to 144, particularly page 139.

JOSEPH L. SCHOFER, *Primary Examiner.*

HAROLD N. BURSTEIN, JAMES A. SEIDLECK,
*Examiners.*